United States Patent
Ahuja et al.

(10) Patent No.: US 8,361,314 B2
(45) Date of Patent: Jan. 29, 2013

(54) SINGLE PIECE RESILIENT COMBINATION BOTTOM SUPPORT AND RELIEF VALVE END SEAL ELEMENT FOR FLUID FILTERS

(75) Inventors: Rajan Ahuja, Fayetteville, NC (US); Travis Canup, Fayetteville, NC (US); L. Steven Cline, Fayetteville, NC (US)

(73) Assignee: Purolator Filters NA LLC, Fayetteville, NC (US)

( * ) Notice: Subject to any disclaimer, the term of this patent is extended or adjusted under 35 U.S.C. 154(b) by 468 days.

(21) Appl. No.: 12/352,944

(22) Filed: Jan. 13, 2009

(65) Prior Publication Data

US 2009/0178962 A1 Jul. 16, 2009

Related U.S. Application Data

(60) Provisional application No. 61/020,919, filed on Jan. 14, 2008.

(51) Int. Cl.
*B01D 27/10* (2006.01)
(52) U.S. Cl. .......................................... 210/130; 137/853
(58) Field of Classification Search .......... 210/130–133; 137/853
See application file for complete search history.

(56) References Cited

U.S. PATENT DOCUMENTS

| | | | |
|---|---|---|---|
| 3,339,738 A | 9/1967 | Wilhelm | |
| 3,785,491 A | 1/1974 | Dudinec et al. | |
| 4,144,168 A | 3/1979 | Thornton | |
| 5,284,579 A | 2/1994 | Covington | |
| 5,833,843 A | 11/1998 | Covington | |
| 6,136,183 A | 10/2000 | Suzuki et al. | |
| 6,214,215 B1 | 4/2001 | Berkey et al. | |
| 6,790,356 B2 | 9/2004 | Wright et al. | |
| 6,793,808 B2 | 9/2004 | McKenzie | |
| 6,926,156 B2 | 8/2005 | Wall | |
| 6,936,161 B2 | 8/2005 | Wright et al. | |
| 6,936,162 B1 * | 8/2005 | McKenzie | 210/130 |
| 7,160,447 B2 | 1/2007 | Yates | |
| 7,168,572 B2 | 1/2007 | Nguyen et al. | |
| 2005/0242012 A1 | 11/2005 | Cline | |
| 2007/0080105 A1 | 4/2007 | Attassery | |
| 2007/0170101 A1* | 7/2007 | Stanhope et al. | 210/130 |

FOREIGN PATENT DOCUMENTS

| | | | |
|---|---|---|---|
| FR | 2 296 454 A1 | | 7/1976 |
| FR | 2296464 A | * | 9/1976 |
| GB | 2 212 412 A | | 7/1989 |
| GB | 2212412 A | * | 7/1989 |
| JP | 10-277319 A | | 10/1998 |
| JP | 10277319 A | * | 10/1998 |

OTHER PUBLICATIONS

International Search Report dated Mar. 6, 2009 (9 pages).
European Search Report dated May 20, 2011 (Seven (7) pages).
Chinese Office Action with English Translation dated Sep. 29, 2012 (fifteen (15) pages).
European Office Action dated Sep. 20, 2012 (four (4) pages).

* cited by examiner

*Primary Examiner* — Terry Cecil
(74) *Attorney, Agent, or Firm* — Crowell & Moring LLP

(57) ABSTRACT

A fluid filter is described, having a filter body defining a cavity for a filter element, a first end cap for fitting on one end of the filter body, having an integrated single piece anti drain back valve and seal, and a second end cap for fitting on an opposite end of the filter body, having an integrated combination relief valve element that includes supports for the filter element.

22 Claims, 8 Drawing Sheets

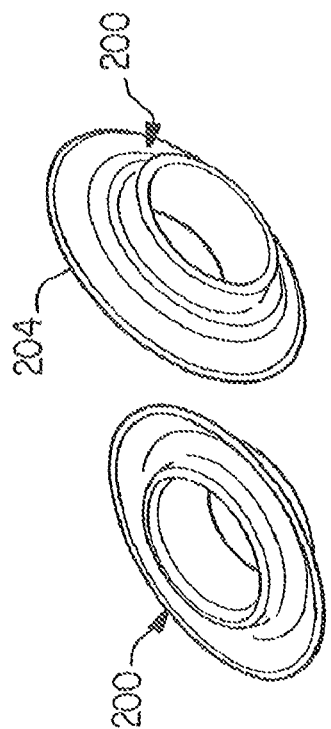
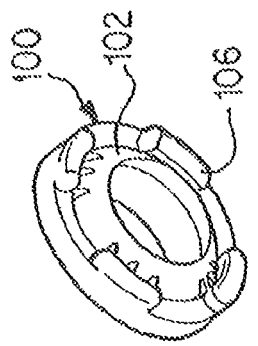
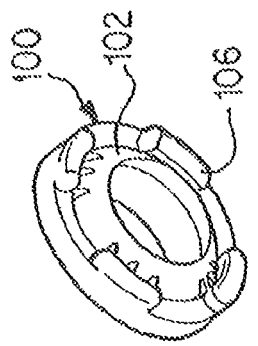
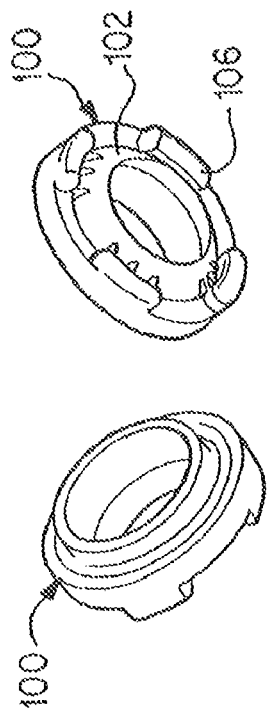
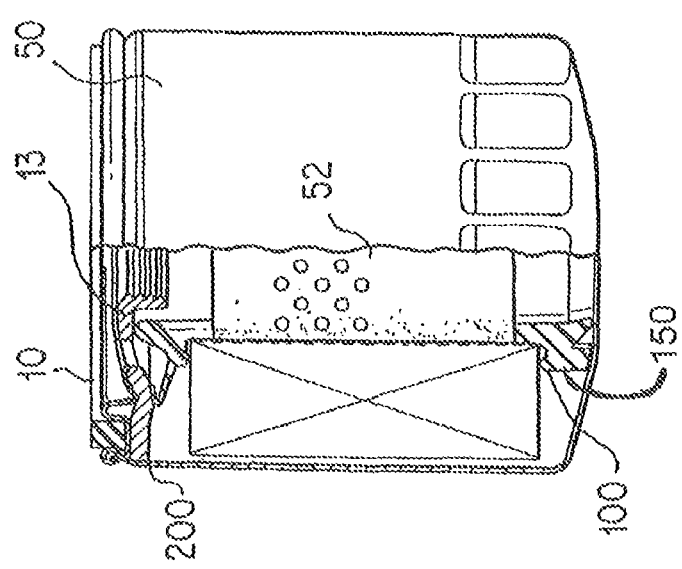

SINGLE PIECE RESILIENT COMBINATION BOTTOM SUPPORT AND RELIEF VALVE END SEAL ELEMENT FOR FLUID FILTERS

CROSS REFERENCE TO RELATED APPLICATIONS

The application is related to U.S. patent application Ser. Nos. 12/038,481, 12/038,498, 61/020,922 and 61/020,924, the contents of which are incorporated herein by reference in their entirety. The present application claims the benefit of the priority date under Jan. 14, 2008 based on the provisional application Ser. No. 61/020,919.

BACKGROUND AND SUMMARY OF THE INVENTION

The present invention is related to a fluid filter having a filter element sealed inside a canister, also called a spin-on type fluid filter. These types of filters are commonly used in lubrication systems of automotive or stationary internal combustion engines that require uninterrupted oil lubrication for moving parts. In these systems, continually filtered oil is supplied through the fluid filter as part of a lubrication circuit.

Conventional designs of conventional fluid filters, such as a typical spin-on or canister sealed fluid filters, include components that are made both of metallic and non-metallic materials that support the main function of filtration performed by the filter element housed inside the filter's can. A typical conventional fluid filter assembly is shown in FIG. 5. The filter includes multiple components and parts that have to be assembled in successive steps, resulting in many no-value added processes. These no-value added processes waste resources and increase the cost of the filter.

The conventional filter element may be a media element 11 which has the main function of filtrating the fluid, is housed in a can 12, and is attached to the threaded plate and retainer assembly 13 to provide a mounting arrangement on the mounting base of an engine. The thread plate assembly 13 has inlet holes 14 used to provide the unfiltered or dirty oil to the filter housing, arranged around a bolt circle diameter surrounding the central thread hole 15. The central hole 15 is used as an outlet of clean, filtered oil from the spin-on filter when the engine is operated.

Typically the oil flows to the filter housing under a design pressure and flow rate delivered by the engine's oil pump (not shown). The filter is mounted on a thread stud (not shown) which fastens to the central thread hole 15. The assembly has a conduit path designed to return the filtered oil from the inner core of the filter element back to the moving or stationary parts of the engine that need continuous lubrication under varied operating conditions.

The anti-drain back valve 16 in the conventional design includes a cup shaped rubber cone 17 covering the inlet holes 14 of the thread plate 13, used to help retain the fluid (in this case oil) in the housing/can when the engine is turned off. This is an important requirement when the filter is mounted with the case dome up and the threaded plate downwards, or in any horizontal or other mounting orientation where the oil would normally exit the can by gravity. When the engine starts, the rubber conical flap 17 unseats from the inlet holes 14 due to the force of the pressurized supply of fluid, and allows the flow of fluid into the filter housing.

When the lubrication pump and/or the engine are turned off, the conical round flap 17, which forms the anti drain back valve, seats back on the circumferential seat 18 of the metal threaded plate to prevent the flow of oil from draining out of the filter through the inlet holes. This helps retain the oil or other fluid in the filter housing. Benefits of this feature include preventing the filter from drying out, and air from being trapped in the oil piping. In addition, as the engine is started, the required oil flow is achieved instantly, without any air pockets being formed in the lubrication circuit.

In conventional filter designs currently in production, a filter media element 11 may include a bottom spring support or an element guide 19 to provide sealing of the inlet to the outlet by cushioning the design stack-up tolerances of various assembly components. This may be achieved by using compression spring or element guide type supports, as shown in FIG. 5. The conventional end sealing cap may be a plastic or metal cap 20 used to seal the filtration element made of filter media 11. The end cap 20 provides a seat for a relief or by-pass valve which includes an assembly of multiple components such as a spiral or compression spring 21, a piston 22 and U-clamp 23 that are welded or riveted to the end cap to hold all the components together. This configuration also allows the relief or bypass valve to function (see FIG. 4) by allowing the fluid to bypass the filter elements if the filter becomes clogged.

End cap assemblies of the can 12 generally include several other components. The described relief valves may be disposed on a thread side (inlet side) of the filter, on the top end caps or on the bottom side caps of the filtration elements. The relief valve is used in the filter element to provide lubrication oil in the event of cold starting conditions, when the engine is turned-on after being off for extended periods of time and the fluid is so thick that it does not flow easily, or when the filtration media becomes clogged by excessive usage or excessive dirt in the oil. The relief valve or by-pass valve opens when a pre-set pressure differential has built-up in the filter, to connect the inlet to the outlet without passing through the filtering media, and prevent lubrication starvation of the engine.

A conventional filter of the spin-on type is generally constructed using the following components, to achieve the desired filtration function. With reference to FIGS. 5a and 5b, the conventional filter includes:

Filter housing 12.
Thread Plate with retainer 13 for assembly with the filter housing 12.
Seal gasket 10.
Filter Media element 11 with supporting Center tube 9.
Anti Drain Back Valve (ADB) 16.
Relief valve (RV) 08.
Bottom support 19.

The following supplementary components that constitute the internal parts and/or assemblies of the conventional filter are also generally required:

Bottom spring/element guide 19.
Relief valve housing 23.
Relief valve spring 21.
Relief valve piston 22.
End cap Bottom/Top 20.
Welding or riveting process for Relief valve assembly 31.
Bonding with adhesive 32 of metal or plastic cap to filter element and thermal curing process thereof.

According to the exemplary embodiments of the invention, the additional components described above are replaced by a single-piece, resilient end elements of the filter. Several manufacturing processes used conventionally to assemble the additional filter components are also avoided, further simplifying and reducing the cost of the process. As will be described in greater detail below, specially shaped integrated components formed from resilient materials, preferably assembled using interference fitting to retain the parts together, define the cap and the bottom support of the filter. In one exemplary embodiment, the end cap may also define the relief valve, an end seal, and a bottom support for the filter media. Another exemplary end cap may define the anti-drain back valve and an end seal.

Other objects, advantages and novel features of the present invention will become apparent from the following detailed description of the invention when considered in conjunction with the accompanying drawings.

BRIEF DESCRIPTION OF THE DRAWINGS

In the drawings:

FIG. 6 is a side cut-away view showing a spin-on fluid filter according to an embodiment of the present invention, including a combination bottom support-end seal with relief valve and a combination anti-drain back valve with end seal;

FIGS. 6a-d show perspective views of the top and bottom elements according to the invention shown in FIG. 6;

DETAILED DESCRIPTION OF THE DRAWINGS

Figure 1:
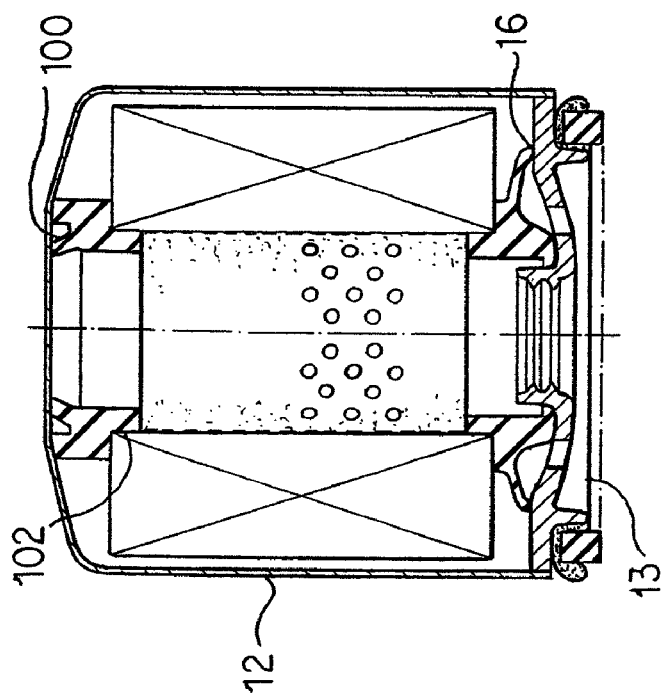
FIG. 1 shows a diagram of a no oil flow condition, or engine off—pump off condition of an oil filter for an internal combustion engine that requires an anti drain back valve.

An exemplary embodiment of a combination bottom support, end seal and relief valve according to the present invention is shown in FIGS. 8a to 8d. This integrated element is also shown as a component of the filter assembly depicted in the diagram of FIG. 6. A comparison of the components of the present invention with those of a conventional design oil filter may be made by referring to FIG. 5. The exemplary embodiment of the invention eliminates many non-value adding parts and processes used conventionally, and brings about a simplified, less costly assembly. In the present invention, the exemplary fluid filter is radically re-designed to avoid using various components like the bottom support-guide or spring, end cap, bonding plastisol/glue, relief valve spring, piston, relief valve housing/U-clamp and others. Several processes requiring heating ovens for curing and bonding, welding and riveting processes that are used conventionally to form the filter are also avoided. All these elements and processes are replaced according to the invention by an integrated, single piece combination support—relief valve—end seal, that carries out the functions of multiple conventional components. The exemplary integrated single piece component may be molded from resilient silicon or nitrile rubber materials or compounded plastisol, polyurethane or any other compounds and materials having comparable properties.

The exemplary embodiments of the present invention include a one piece combination relief valve element 100 that integrates a relief valve portion 102 with sealing lip 104, bottom support lugs 106 placed adjacent to openings 108, and an end sealing element 112. This single integrated, one piece component thus serves as the relief valve, the end seal and the support of the filtering media. The one piece combination relief valve element 100, when closed, forms a seal between inlet and outlet passages of the filter cavity and causes the fluid to pass through the filter media 11 before exiting the filter.

In more detail, the one piece combination relief valve element 100 includes a relief valve portion 102 made of resilient material (rubber, polyurethane or any other suitable compound) that has a sealing lip 104 adapted to seal the filter element inlet from the outlet. For example, the sealing lip 104 may be a truncated conical membrane extending circumferentially from an inner diameter of the one piece combination relief valve element 100, forming a seal with portions of the filter body in communication with an outlet.

The exemplary one piece combination relief valve element 100 also includes bottom support lugs 106 used to support the pleated filter media element, and uniformly distributed openings 108 disposed around the shape for the inlet flow of lubricating fluid. The bottom support lugs 106 may be spaced circumferentially to define the openings 108. The exemplary component further includes integral circular and/or conical shaped inverse cups with retracting ribs 110, designed to help close back the relief valve 102 when it is not needed to be open. The valve 102 may also include portions without the ribs 110, designed to help initiate the relief valve opening without resistance when the selected pressure differential across the valve is reached. The exemplary ribs 110 may be formed as individual ribs or as groups of more than one rib, spaced equally or unequally around the circumference of the sealing lip 104 or relative to the support lugs 106.

The exemplary end cap 150 of the filter element is sealed to the case bottom of the can 12 with the sealing element 112 of the combination relief valve element 100. This arrangement is used instead of a conventional separate metal or plastic end cap which is bonded with plastisol or other bonding glues and thermal energy to the filter body. Fewer parts and assembly steps are thus required.

According to embodiments of the present invention, all required functions of the bottom cap of the filter may be combined in a single integrated component, as described above. Various additional conventional components like a bottom spring and/or element guide and end caps that require non-value adding processes can be eliminated.

The exemplary integrated one piece combination relief valve 100 may use interference fit provided by snug tolerances for achieving a positive locking and sealing effect with the can 12, and thus may avoid any additional thermal bonding processes. This further reduces non-value adding materials, components, processes and labor costs. In addition, by reducing the number of components that are stacked, the exemplary configuration according to the invention reduces the accumulation of dimensional errors, due to manufacturing tolerances associated with each component part. A simplified manufacturing process with fewer stacked parts may reduce the cumulative dimensional error of the filter.

As explained above, a number of conventional components such as the bottom spring support or element guide, end cap and relief valve are all combined in one integrated element to form the exemplary combination one piece bottom support element end seal with relief valve. The exemplary combination can eliminate 6 to 7 now unnecessary components, as listed above, the related processes and non-value added tasks needed to assemble them, and permits a reduction of inventories of components.

The exemplary combination relief valve element 100 may be assembled, for example, together with the filter element pack 11 by using design interference tolerances. The contoured circumferential ledge 120 may be disposed around the perforated center tube 52 of the filter 50, to define an inner diameter (ID) periphery of the conduit 122. The combination relief valve element 100 is also adapted to form a seal between the clean side (normally inner side) and the dirty side (normally outer) of the oil passages.

The support lugs 106, of which four may be provided in the exemplary embodiment, support the filter element assembly 11 in the housing can 12, and may be formed from materials with the resilient properties of polymers such as silicon, nitrile or any other rubber compounds and materials. The sealing lip 104 formed on the exemplary combination relief valve element 100 seals the filter element to separate the clean side from the dirty side of the filter element. In one exemplary embodiment, the lip seal 104 may extend to match the same plane as the bottom of the support lugs 106. Alternatively, the edge of the lip seal may have a positive or negative offset relative the plane of the support lugs, for example to vary the opening pressure of the relief valve element 102.

Figure 4:
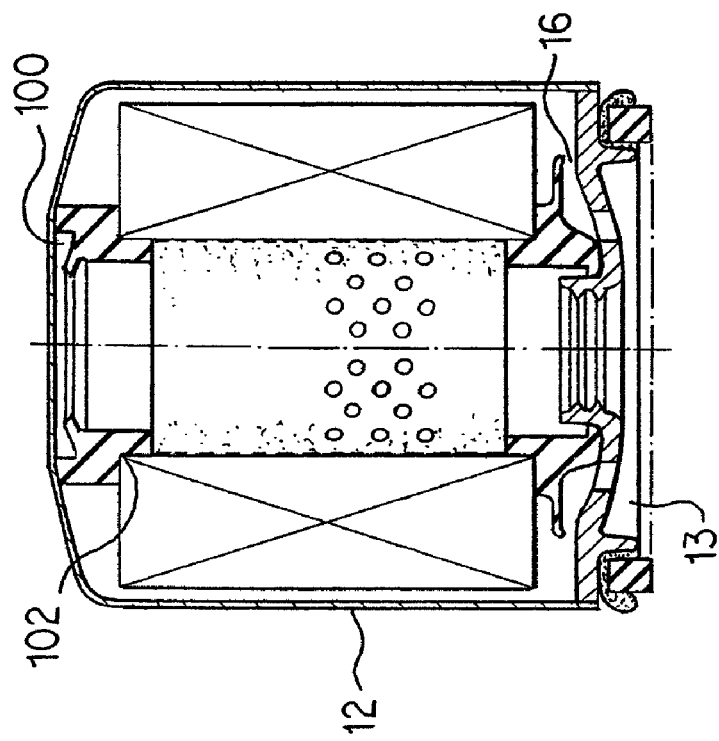
FIG. 4 shows a diagram of the oil filter shown in FIG. 1 with the relief valve lip giving way to allow oil flow under differential pressure built-up conditions.
Figure 3:
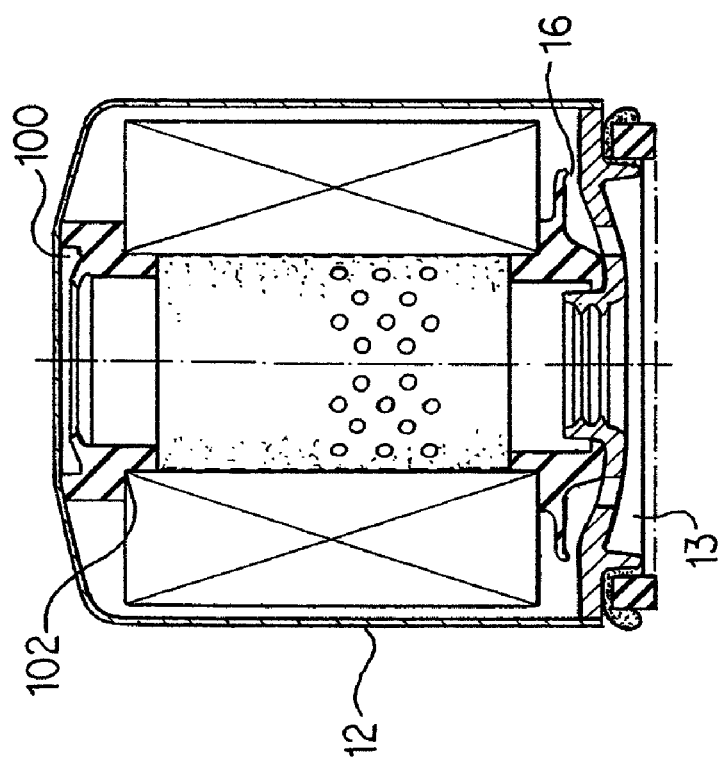
FIG. 3 shows a diagram of the oil filter shown in FIG. 1 in an opening condition of the relief valve, under partial restriction conditions.

When a sufficient pre-selected design pressure differential is reached across the exemplary combination relief valve element 100, the relief valve sealing lip 104 gives way and lifts from sealing contact with the case of the can 12, and opens leading the way to the bypass or relief valve to function. The exemplary relief valve portion 102 may be designed to open under partial or full restriction conditions of the filter 50, as is shown in FIGS. 3 and 4. The relief valve lip 104 seats back and seals the inlet from the outlet (i.e. the clean side from the dirty side) under normal, unrestricted conditions, and when the pre-selected design pressure differential has not been reached.

FIG. 1 to FIG. 4 depict the functioning of an embodiment of the present invention, which includes a combination relief valve element 100 having a bottom support and a relief valve 102, as well as an anti-drain back valve 16 opposite to the relief valve 102, for use in a spin-on fluid filter 10. FIG. 1 shows a no oil flow condition, or engine-off-pump off condition. This dome-up view shows the case/can 12 with thread plate 13 facing downward. Both relief valve 102 of the combination relief valve element 100 and anti-drain back valve 16 are closed in this condition.

Figure 2:
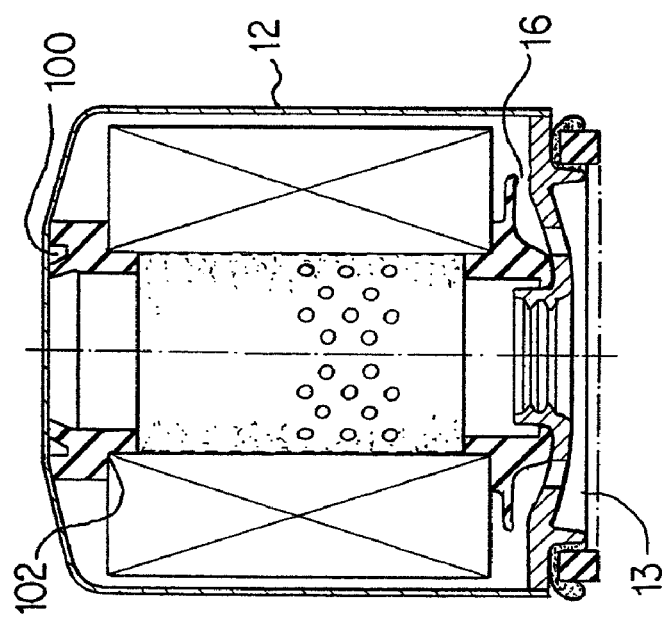
FIG. 2 shows a diagram of the oil filter shown in FIG. 1 in a normal oil flow condition when engine/pump are operating.

FIG. 2 shows a normal oil flow condition when the engine/pump are operating. Oil enters in the filter housing 50 as the anti-drain back valve lip gives way (opens-up) under normal operating pressures, and dirty oil enters the filter housing can 12. The relief valve 102 is closed in this condition, and clean oil comes out of the filter through the threaded stud on the mounting base 13. Flow curves in the sketch indicate the direction of flow within the filter.

FIG. 3 shows the opening condition of the relief valve 102, under a partial flow restriction condition. FIG. 4 shows the relief valve lip 104 giving way to provide a flow of oil, by lifting up from the filter case bottom under a differential pressure built-up condition that exceeds the pre-selected design pressure differential. This condition corresponds to a fully restricted flow through the filter, and is similar to the condition shown in FIG. 3, except for the greater extent of the opening of the relief valve lip 104.

FIG. 6 shows a spin-on fluid filter 50, that includes elements according to an exemplary embodiment of the present invention. In particular, the combination relief valve element 100 which integrates a bottom supports 106, an end seal 112 and a relief valve 102 is shown. The filter 50 also includes a combination anti drain back valve 200 with end seal 204, disposed on the opposite end of the filter 50 from the combination relief valve element 100.

Figure 5B:
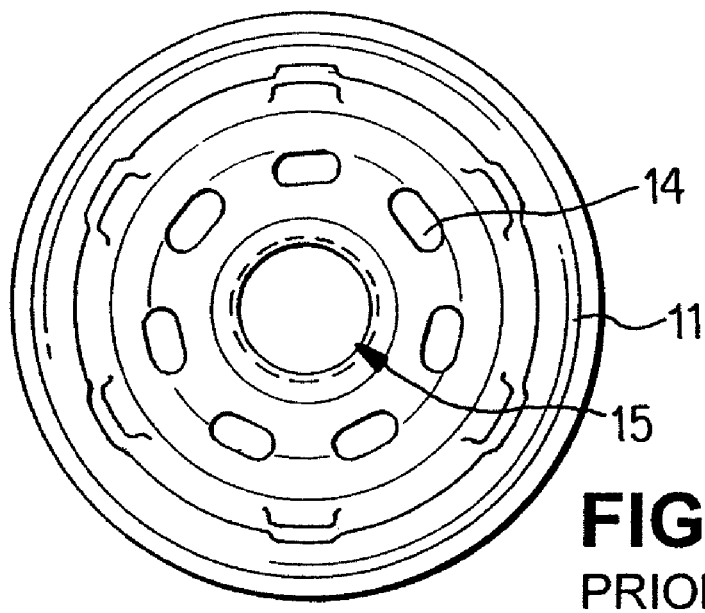
FIGS. 5a and 5b are respectively a top and a side cut-away view showing the components in a conventional spin-on fluid filter.
Figure 5A:
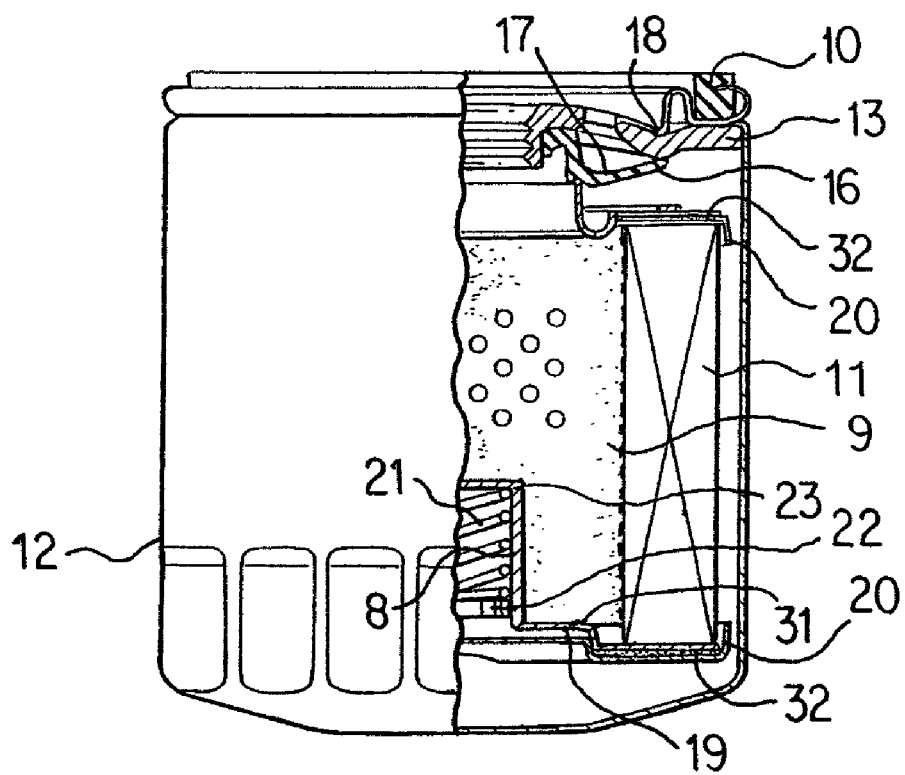

FIG. 6 can be compared to FIG. 5 to note the reduction in parts brought about by the embodiments according to the invention. FIGS. 6a-b show perspective views of the combination anti drain back valve 200 disposed at the top end of the filter, near the mounting plate 13, according to an exemplary embodiment of the present invention. FIGS. 6c-d show perspective views of the combination relief valve element 100 disposed at the bottom of filter 50, according to the invention. Both of these integrated components may be utilized in an exemplary filter 50, to maximize the reduction in parts and processes needed.

Figure 7:
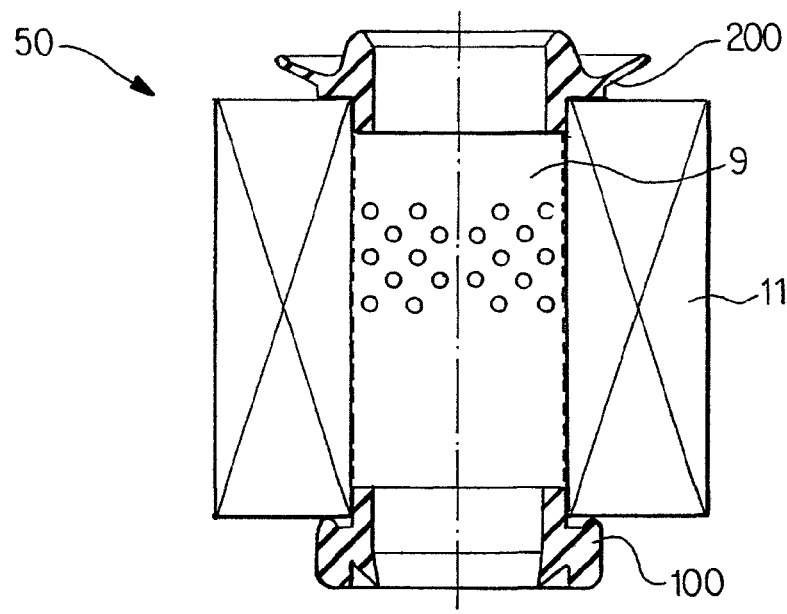
FIG. 7 shows a cross section of the combination bottom support-relief valve-end seal in assembly with a filter element, according to an embodiment of the invention.

FIG. 7 shows the exemplary filter 50 having both the combination relief valve element 100 including the bottom support, relief valve and end seal, in assembly with the filter element 11 and the combination anti-drain back valve element 200. FIG. 7 provides a more generalized view of the filter 50 than is provided in FIG. 6 described above.

Figure 8:
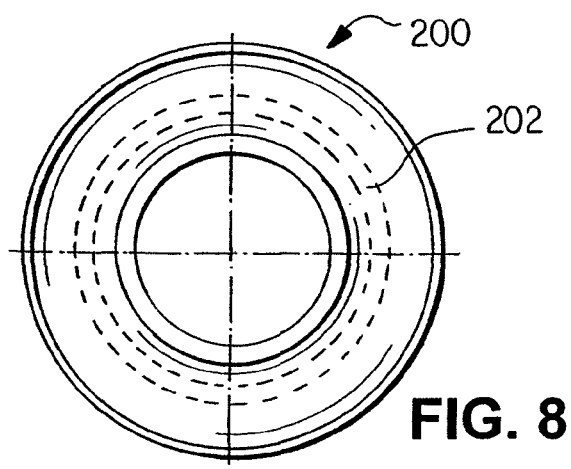
FIG. 8 shows a top plan view of the combination end seal and anti-drain back valve according to an embodiment of the invention.
Figure 8E:
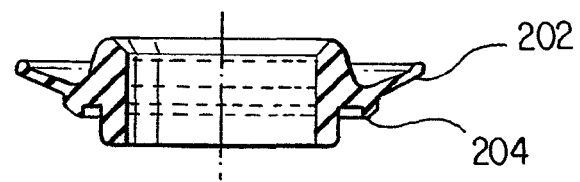
FIG. 8e shows a side elevation view of the combination end seal and anti-drain back valve according to an embodiment of the invention.
Figure 8A:
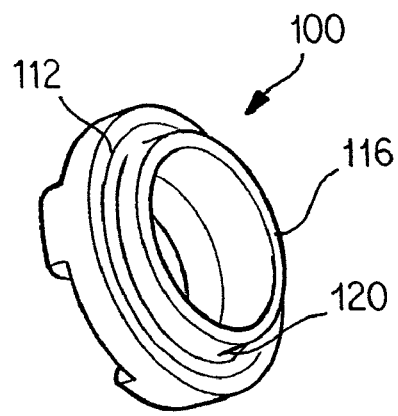
FIGS. 8a-d show two perspective views, a side elevation and a top plan views of an exemplary embodiment of a combination bottom support and relief valve according to the present invention.
Figure 8C:
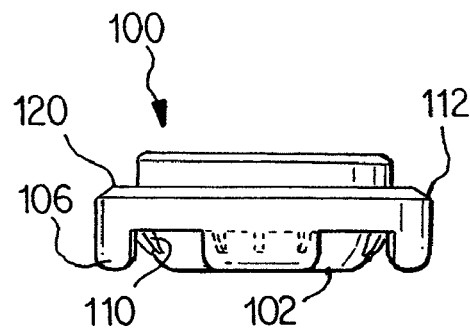
Figure 8B:
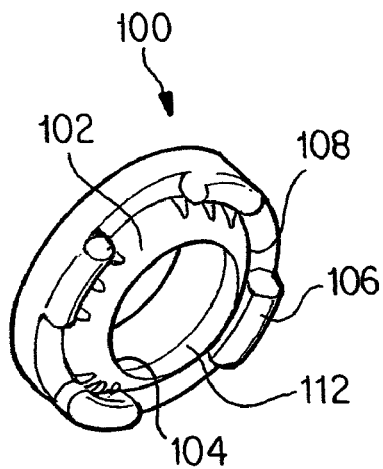
Figure 8D:
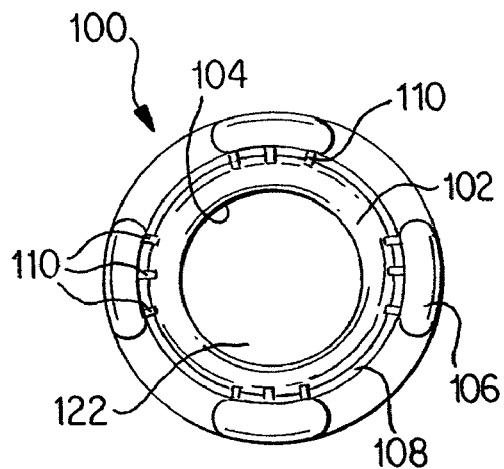

The number of internal components in a combination relief valve element according to embodiments of the invention is significantly reduced compared to a conventional filter. The parts shown in the exemplary filter 50 are assembled principally using interference fit. FIGS. 8a-d show more detailed perspective views, a plan view and a side view of an exemplary embodiment of the single piece combination relief valve element 100 according to the invention, which integrates all the features described above. FIG. 8e shows in more detail an exemplary combination anti-drain back valve element 200 according to the invention, having a sealing lip 204 and an anti-drain back flange 202, which can also be included in the exemplary filter 50.

Figure 9A:
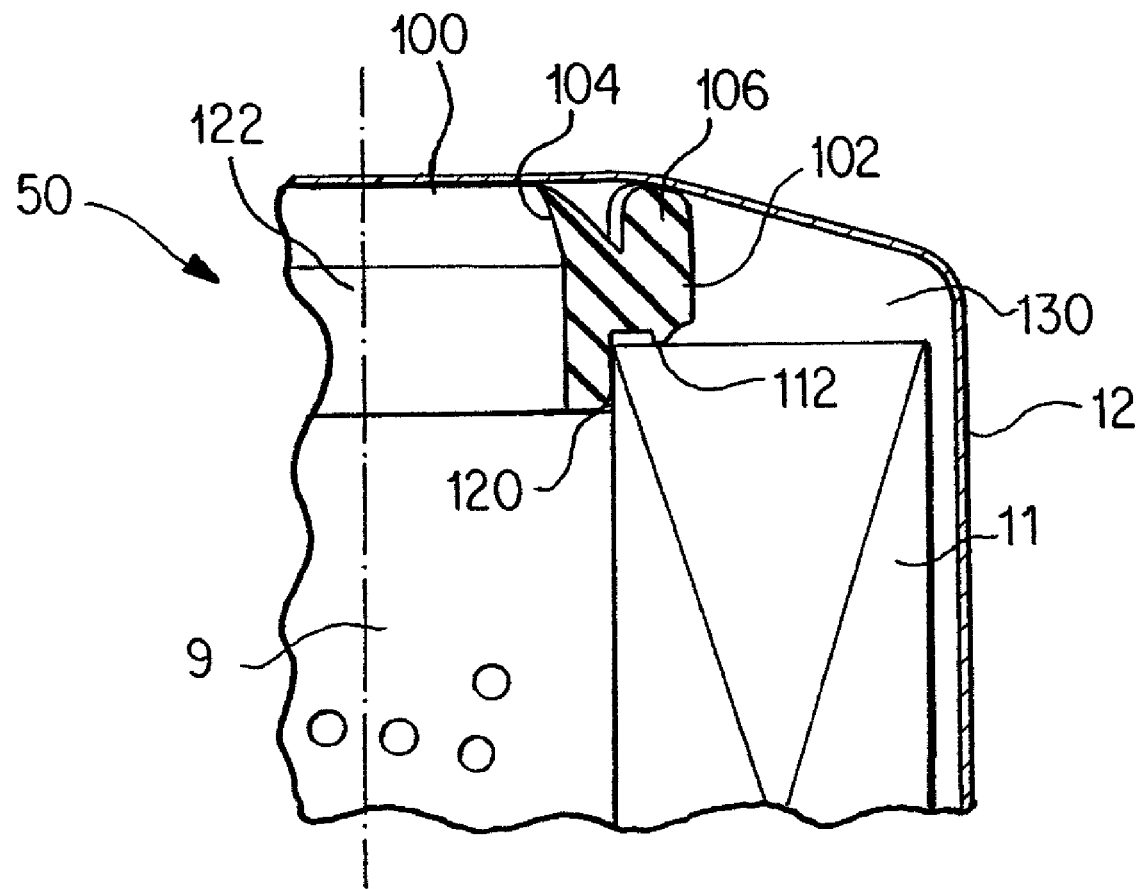
FIGS. 9a-c show detail views of a combination bottom seal-relief valve-end seal, respectively in a normal flow condition, a partially restricted flow condition and a fully restricted flow condition, according to an embodiment of the invention.
Figure 9B:
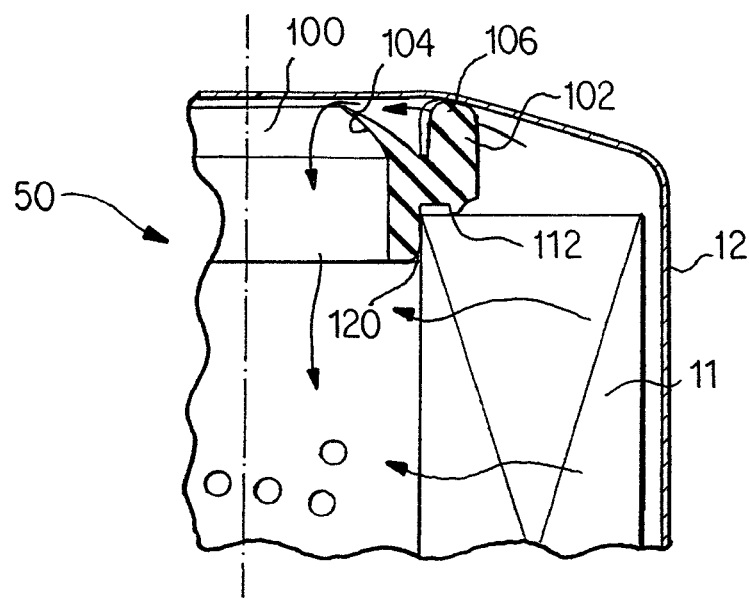
Figure 9C:
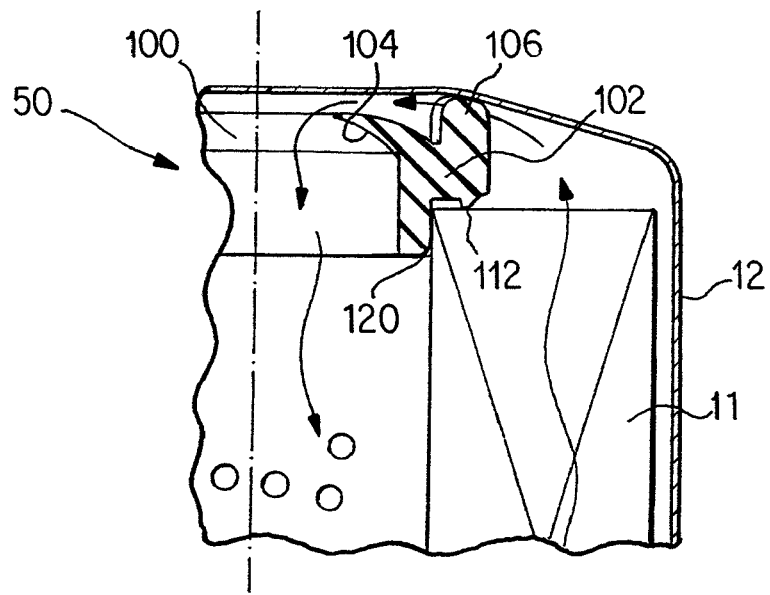

FIGS. 9a-c show enlarged detail views of the single piece combination relief valve element 100 corresponding to the overall flow conditions depicted in FIGS. 1-4. More specifically, FIG. 9a depicts the state of the combination relief valve element 100 in a normal configuration, obtained for example in a no oil flow condition caused by the engine and/or the fluid pump being off. The same configuration is obtained in a normal flow condition, when the oil flows normally through the filter without restriction. In this condition, the sealing element 112 and the valve sealing lip 104 prevent the unfiltered fluid in the cavity 130 from bypassing the filter media pack 11, and entering in the center tube 9. The fluid thus has to pass through the filter media pack 11 before exiting the filter, under normal operating pressures.

FIG. 9b shows a bypass flow condition of the combination relief valve element 100, corresponding to a partial restriction of the filter 50. In this condition, the valve sealing lip 104 begins to open, and a certain amount of unfiltered fluid is permitted to bypass the filter media 11, and to go directly form the cavity 130 to the center tube 9 by way of the conduit 122.

Another bypass flow condition of the one piece combination relief valve element 100 is shown in FIG. 9c. In this condition, the flow results from an extremely restricted state of the filter 50, such that a large amount of unfiltered fluid passes directly from the cavity 130 to the center tube 9. Here, the valve sealing lip 104 is completely deflected away from the inner surface of the filter can 12, allowing the fluid to largely bypass the filter media 11. This condition could result, for example, from a severe clogging of the filter media 11, which would cause a large pressure differential across the relief valve portion 102. The valve sealing lip may have different degrees of opening depending on the differential pressure resulting from different amounts of restriction. In all the above conditions, the end sealing element 112 formed integrally with the combination relief valve element 100 maintains a seal with the body of the filter 50.

The combination relief valve element according to the various exemplary embodiments of the invention provides, among others, the following advantageous features:

1. The exemplary combination relief valve element made of resilient material fully replaces multiple other components and processes to assemble them, as described above, thus reducing the number of parts and manufacturing processes required.
2. The shaped RV opening-flow zones 108 and the shape of the support lugs 106 of the combination relief valve element that reduces the cumulative assembly stack-up tolerances simplifies accurate manufacturing.
3. The relief valve sealing lip 104 is designed and shaped to open and close in the assembly, based on required pressure differential, to perform the function of a separate relief valve in a conventional filter assembly.
4. The retracting ribs 110 that help retract and close the relief valve 102 by bringing back the sealing lip 104 in contact with case dome when the relief valve is required to be closed ensure that unfiltered oil does not circulate in normal conditions.
5. Proportionately spaced and un-ribbed passages 108 are provided to help initiate relief valve opening. This proportionally spaced portions with no ribs help to eliminate resistance to opening the relief valve at a required differential pressures.
6. The end seal 112 that provides circumferential line contact with the filter element pack, concentric to an inner diameter of the center tube 9, prevents unwanted flow of the fluid.
7. The sealing tubular pilot 116 is adapted to provide interference fit and sealing with center tube core 9 of the filter element.
8. The open ended conduit 122 is provided for by-pass/relief flow.

Additionally, the exemplary combination anti-drain back valve element 200 having an end seal may include the sealing lip shape 204 designed to provide sealing between filter elements, and to prevent inlet to outlet leakage.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fluid filter, comprising:
   a filter can;
   a filter body defining a cavity containing a filtration element;
   an inlet of the cavity for flowing a fluid into the fluid filter and an outlet for removing the fluid therefrom; and
   a first end cap for fitting on an end of the filter body, having a one piece combination relief valve element including a central axis and integrating a relief valve portion, an end seal and supports for the filter element, wherein the relief valve portion when closed directs the fluid through the filtration element, and when open bypasses at least a portion of the fluid from the filtration element, wherein the relief valve portion, when closed, is in sealing contact with the filter can;
   wherein the supports include a plurality of support lugs disposed along a radially outermost circumference of the one piece combination relief valve element, each of the support lugs having a length in a circumferential direction that is larger than a width in a radial direction.

2. The fluid filter according to claim 1, wherein the fluid filter comprises a second end cap for fitting to an opposite end of the filter body, having an anti drain back valve and a seal.

3. The fluid filter according to claim 1, wherein the relief valve portion is closed unless a pressure across the one piece combination relief valve element is above a pre-set pressure differential.

4. The fluid filter according to claim 1, wherein the relief valve portion has different degrees of opening between closed and fully open, in response to a pressure across the one piece combination relief valve element.

5. The fluid filter according to claim 1, further comprising a sealing lip of the relief valve portion for forming an annular seal to prevent bypass of the filter element when the relief valve portion is closed.

6. The fluid filter according to claim 1, further comprising retracting ribs for assisting closing of the relief valve portion when a fluid pressure across the one piece combination relief valve element is below a pre-set pressure differential,
   wherein each of the support lugs has a plurality of the retracting ribs arranged adjacent thereto.

7. The fluid filter according to claim 5, further comprising retracting ribs of the sealing lip for assisting closing of the relief valve portion when a fluid pressure across the one piece combination relief valve element is below a pre-set pressure differential.

8. The fluid filter according to claim 7, further comprising initial opening zones of the sealing lip devoid of the retracting ribs, for assisting opening the relief valve when a fluid pressure across the one piece combination relief valve element is above the pre-set pressure differential.

9. The fluid filter according to claim 1, wherein the one piece combination relief valve element further comprises an end sealing element disposed on a circumferential ledge for sealing the one piece combination relief valve element to the outlet of the cavity.

10. The fluid filter according to claim 1, wherein the one piece combination relief valve element is assembled with the filter body and the first end cap using interference fitting.

11. The fluid filter according to claim 1, wherein the one piece combination relief valve element is formed of a resilient polymer.

12. The fluid filter according to claim 1, wherein the one piece combination relief valve element is formed of at least one of resilient silicon, nitrile rubber materials, compounded plastisol and polyurethane.

13. A fluid filter, comprising:
a filter can;
a filter body defining a cavity containing a filtering element; and
a one piece combination relief valve element sealable between inlet and outlet passages of the filter body, for selectively directing a fluid from the inlet passage to at least one of the outlet passage and the filtering element;
wherein the one piece combination relief valve element comprises a central axis, a relief valve portion, an end seal, and a plurality of support lugs,
the relief valve portion is openable in response to a pressure differential across the relief valve portion,
the relief valve portion, when closed, is in sealing contact with the filter can; and
the support lugs are disposed along a radially outermost circumference of the one piece combination relief valve element, each of the support lugs having a length in a circumferential direction that is larger than a width in a radial direction.

14. The fluid filter according to claim 13, wherein the relief valve portion remains closed when the pressure differential is below a pre-set pressure differential.

15. The fluid filter according to claim 13, further comprising retracting ribs acting on a sealing lip of the relief valve portion for assisting in closing the sealing lip.

16. The fluid filter according to claim 15, wherein at least one of the retracting ribs is disposed adjacent a support lug to act on the sealing lip.

17. The fluid filter according to claim 15, wherein the retracting ribs are disposed symmetrically about a circumference of the sealing lip.

18. The fluid filter according to claim 13, further comprising retracting ribs for assisting closing of the relief valve portion when a fluid pressure across the one piece combination relief valve element is below a pre-set pressure differential,
wherein each of the support lugs has a plurality of the retracting ribs arranged adjacent thereto.

19. The fluid filter according to claim 13, further comprising an end sealing element of the one piece combination relief valve element for impeding passage of fluid between the inlet and the outlet.

20. The fluid filter according to claim 13, wherein the one piece combination relief valve element, when the pressure differential is above a pre-set pressure differential, allows at least a portion of the fluid to bypass the filtration element.

21. The fluid filter according to claim 13, wherein the one piece combination relief valve element is formed of a resilient polymer.

22. A one piece combination relief valve element for a fluid filter, comprising:
a central axis;
a relief valve portion openable in response to a pressure differential between an inlet and an outlet of the fluid filter, the relief valve portion, when closed, being in sealing contact with a filter can of the fluid filter;
a support portion, including a plurality of support lugs, for supporting a filtering element of the fluid filter; and
an end sealing element for sealing the one piece combination relief valve element to at least one of a filter body and the filtering element;
wherein the support lugs are disposed along a radially outermost circumference of the one piece combination relief valve element, each of the support lugs having a length in a circumferential direction that is larger than a width in a radial direction.

* * * * *